(12) United States Patent
Fan et al.

(10) Patent No.: US 12,230,935 B2
(45) Date of Patent: Feb. 18, 2025

(54) AIR IONIZATION DISPLAY DEVICE

(71) Applicant: ANHUI EASPEED TECHNOLOGY CO., LTD., Anhui (CN)

(72) Inventors: Chao Fan, Anhui (CN); Dongcheng Han, Anhui (CN)

(73) Assignee: ANHUI EASPEED TECHNOLOGY CO., LTD., Hefei (CN)

( * ) Notice: Subject to any disclaimer, the term of this patent is extended or adjusted under 35 U.S.C. 154(b) by 544 days.

(21) Appl. No.: 17/454,942

(22) Filed: Nov. 15, 2021

(65) Prior Publication Data
US 2022/0075315 A1    Mar. 10, 2022

Related U.S. Application Data

(63) Continuation of application No. PCT/CN2021/072084, filed on Jan. 15, 2021.

(30) Foreign Application Priority Data

Jan. 16, 2020  (CN) .......................... 202010048268.8
Jan. 16, 2020  (CN) .......................... 202010049368.2
(Continued)

(51) Int. Cl.
*H01S 3/102*       (2006.01)
*G02B 30/56*      (2020.01)
(Continued)

(52) U.S. Cl.
CPC ............ *H01S 3/1024* (2013.01); *G02B 30/56* (2020.01); *H01S 3/005* (2013.01);
(Continued)

(58) Field of Classification Search
CPC ........ H01S 3/0046; H01S 3/005; H01S 3/067; H01S 3/1024; H01S 3/13; H01S 3/23;
(Continued)

(56) References Cited

U.S. PATENT DOCUMENTS 4,896,150 A    1/1990  Brotz
5,367,529 A    11/1994 Holsinger et al.
(Continued)

FOREIGN PATENT DOCUMENTS

CN    1272196 A    11/2000
CN    1394297 A    1/2003
(Continued)

OTHER PUBLICATIONS

Office Action from related Japanese Appln. No. 2021-549105 dated Oct. 25, 2022. English translation attached.
(Continued)

*Primary Examiner* — Michael Carter
(74) *Attorney, Agent, or Firm* — Grossman, Tucker, Perreault & Pfleger PLLC

(57) ABSTRACT

An air ionization display device includes: a pulse-light-source module configured to generate a plurality of synchronous pulse light beams; and a light field control module, the plurality of pulse light beams being projected to the light field control module and the light field control module being configured to adjust and merge the plurality of pulse light beams and ionize air in a display area to form a holographic real image.

18 Claims, 4 Drawing Sheets

(30) Foreign Application Priority Data

| Jan. 16, 2020 | (CN) | 202010057978.7 |
| Jan. 16, 2020 | (CN) | 202020099626.3 |
| Jan. 16, 2020 | (CN) | 202020125100.8 |
| Jan. 16, 2020 | (CN) | 202020125167.1 |

(51) Int. Cl.
*H01S 3/00* (2006.01)
*H01S 3/10* (2006.01)
*G03H 1/00* (2006.01)
*H01S 3/04* (2006.01)

(52) U.S. Cl.
CPC . *H01S 3/10046* (2013.01); *G03H 2001/0088* (2013.01); *H01S 3/0407* (2013.01)

(58) Field of Classification Search
CPC ........ G02B 26/08; G02B 26/10; G02B 27/10; G02B 30/56
See application file for complete search history.

(56) References Cited

U.S. PATENT DOCUMENTS

| 5,871,267 | A | * | 2/1999 | Wende | G09F 19/16 |
| | | | | | 353/62 |
| 11,163,178 | B1 | * | 11/2021 | Rodrigues | G02B 26/101 |
| 2002/0135856 | A1 | | 9/2002 | Penn | |
| 2004/0233944 | A1 | | 11/2004 | Dantus et al. | |
| 2006/0140232 | A1 | | 6/2006 | Hergenhan et al. | |
| 2010/0232459 | A1 | | 9/2010 | Hashimoto et al. | |
| 2012/0327130 | A1 | * | 12/2012 | Lin | G02B 26/0833 |
| | | | | | 345/63 |
| 2017/0293259 | A1 | * | 10/2017 | Ochiai | G02B 3/0006 |
| 2018/0059618 | A1 | * | 3/2018 | Niu | G03H 1/2202 |
| 2020/0266105 | A1 | | 8/2020 | Ikenoue et al. | |

FOREIGN PATENT DOCUMENTS

| CN | 103033944 | A | 4/2013 | | |
| CN | 103069806 | A | 4/2013 | | |
| CN | 103782592 | | 5/2014 | | |
| CN | 104849868 | | 8/2015 | | |
| CN | 204595346 | U | 8/2015 | | |
| CN | 106198491 | | 12/2016 | | |
| CN | 107861252 | A | 3/2018 | | |
| CN | 107908010 | A | 4/2018 | | |
| CN | 108983331 | A | 12/2018 | | |
| CN | 109841150 | A | 6/2019 | | |
| CN | 111157607 | | 5/2020 | | |
| CN | 111208193 | | 5/2020 | | |
| CN | 111239236 | | 6/2020 | | |
| CN | 211856449 | | 11/2020 | | |
| CN | 212180686 | | 12/2020 | | |
| CN | 212180687 | | 12/2020 | | |
| JP | 2009186654 | A | 8/2009 | | |
| JP | 2016018978 | A | 2/2016 | | |
| JP | 2019117684 | | 7/2019 | | |
| KR | 20140063739 | A | 5/2014 | | |
| KR | 20140095949 | A | 8/2014 | | |
| KR | 101602780 | B1 | 3/2016 | | |
| WO | 0011513 | | 8/1999 | | |
| WO | WO-0011513 | A1 | * | 3/2000 | ......... G02B 26/0875 |
| WO | 2006003457 | A1 | 1/2006 | | |
| WO | 2006067495 | A2 | 6/2006 | | |

OTHER PUBLICATIONS

International Search Report from corresponding PCT Appln. No. PCT/CN2021/072084, dated Apr. 19, 2021.

Huang et al., "Touch-Imaging Method Employing Laser-Ionized Air", Laser & Optoelectronics Progress, Feb. 28, 2019, pp. 031101-1~031101-9, vol. 56, No. 3.

Wang et al., "Pulsed digital Micro-Holography for Femtosecond Order Ultrafast Process Recording by Using Wavelength Division Multiplexing Technology", Acta Optica Sinica, Nov. 30, 2006, pp. 1632-1635, vol. 26, No. 11.

Office Action from related Singaporean Appln. No. 11202113088T, dated Jan. 31, 2023. English translation attached.

Request for the Submission of an Opinion from related Korean application No. 1020217035813, dated Jul. 14, 2023. Machine Generated English translation attached.

First Office Action of CN Corresponding Application 202010057978.7 issued on Jun. 20, 2024 from the CNIPA. (7 pages) English Translation Attached.

First Office Action of CN Corresponding Application 202010048268.8 issued on Jul. 2, 2024 from the CNIPA. (9 pages) English Translation Attached.

First Office Action of CN Corresponding Application 202010049368.2 issued on Jul. 2, 2024 from the CNIPA. (8 pages) English Translation Attached.

The Communication pursuant to Article 94(3) EPC of EP Corresponding Application 21740910.1 issued on Aug. 13, 2024 from the EPO. (5 pages).

Three-Dimensional Display Based on Upconversion Luminescence; Authors: Zeng Wei Zhou Shifeng Xu Shiqing Qiu Jianrong; vol. 44, No. Mar. 3, 2007.

The First Office Action of Corresponding Korean Application No. 10-2024-7009374 issued on Sep. 27, 2024 from the KIPO. (3 pages) English Translation Attached.

The Second Office Action of Corresponding Chinese Application 202010057978.7 issued on Sep. 27, 2024 from the CNIPA. (3 pages) English Translation Attached.

The Second Office Action of Corresponding Chinese Application 202010049368.2 issued on Sep. 27, 2024 from the CNIPA . (5 pages) English Translation Attached.

\* cited by examiner

AIR IONIZATION DISPLAY DEVICE

CROSS-REFERENCE TO RELATED APPLICATION

This disclosure is a continuation of international application No. PCT/CN2021/072084 which claims priority to Chinese Patent Application Nos. 202010057978.7, 202020125167.1, 202010048268.8, 202020099626.3, 202010049368.2 and 202020125100.8 filed on Jan. 16, 2020 by ANHUI EASPEED TECHNOLOGY CO., LTD. and titled with "Air Ionization Display Device".

TECHNICAL FIELD

The disclosure relates to the field of air ionization technologies, and in particular, to an air ionization display device.

BACKGROUND

An air ionization imaging system employs a lens to converge light beams to ionize air at a focal point of the lens to form light spots during an imaging process. Since a light power threshold per unit area, of pulses required for air ionization, is high, a number of converged points formed at each ionization point by a light field modulated by a spatial light modulator is limited by a pulse power, that is, pixels of a display screen are subject to a size of the pulse power. If the pixels of the display screen are to be increased, the pulse power output by the light source needs to be increased. However, it is difficult to greatly increase the pulse power output by the light source in the related art, which makes it difficult to increase the pixels of the display screen of the air ionization system.

SUMMARY

The air ionization display device provided in embodiments of the disclosure may include: a pulse-light-source module configured to generate a plurality of synchronous pulse light beams; and a light field control module, the plurality of pulse light beams being projected to the light field control module and the light field control module being configured to adjust and converge the plurality of pulse light beams and ionize air in a display area to form a holographic real image.

Additional aspects and advantages of the disclosure will be set forth in part in the following description which follows, and some will become obvious from the following description or learned through practice of the disclosure.

BRIEF DESCRIPTION OF DRAWINGS

The above and/or additional aspects and advantages of the disclosure will become apparent and readily appreciated from the following description of embodiments, taken in conjunction with the accompanying drawings, in which.

Figure 1:
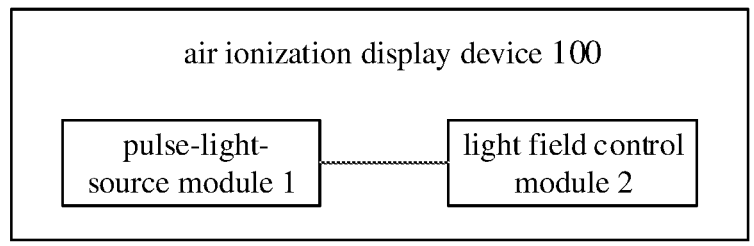
FIG. 1 is a block diagram of an air ionization display device according to an embodiment of the disclosure.

REFERENCE NUMERALS air ionization display device 100;
pulse-light-source module 1, light field control module 2;
first pulse-repetition-frequency adjustment component 3, first pulse delay monitor 4, first delay line, display area 200;
pulse light source 10, first beam combiner 11, first beam splitter 12, second beam splitter 13, first reflecting mirror 14;
first photodetector 32, first frequency reference source 32, first servo controller, controller 42;
first pulse light source 101, second pulse light source 102, photodetector 311, photodetector 312, photodetector 313, first upper beam splitter 123, first middle beam splitter 121, first lower beam splitter 122, beam combiner 111, beam combiner 112, first reflecting mirror 71, second reflecting mirror 72, first delay line 5 includes delay line 61, delay line 62 and delay line 63;
second beam combiner 4-1, second delay line 2-12, second reflecting mirror 3-1, water-cooled radiator 8-1, pulse-light-source housing 10-1, computer 9-1, controller 7-1;
second pulse-repetition-frequency adjustment 20, controller 52, third beam splitter 17, second photodetector 21, second frequency reference source 22, second servo controller 23, pulse generator 011, light field regulator 012, imaging area 40, second pulse delay monitor 8, third delay line 9, fourth beam splitter 18, third beam combiner 19, third reflecting mirror 34, front fourth beam splitter 181, rear fourth beam splitter 182.

DETAILED DESCRIPTION

Descriptions will now be made in detail to embodiments of the disclosure, examples of which are illustrated in the drawings. The following description refers to the drawings in which the same or similar reference numerals indicate the same or similar elements or elements with the same or similar functions throughout. The embodiments described below with reference to the drawings are exemplary, and are only used to explain the disclosure, and should not be construed as limiting the disclosure.

Hereinafter, an air ionization display device according to some embodiments of the disclosure will be described with reference to the drawings.

FIG. 1 is a block diagram of an air ionization display device according to an embodiment of the disclosure. As illustrated in FIG. 1, the air ionization display device 100 according to an embodiment of the disclosure may include a pulse-light-source module 1 and a light field control module 2.

The pulse-light-source module 1 is configured to generate a plurality of synchronous pulse light beams. For example, the pulse-light-source module 1 may emit the plurality of pulse light beams simultaneously and simultaneously providing the plurality of pulse light beams may increase the light-source energy. The plurality of pulse light beams may be projected to the light field control module 2. The light field control module 2 is configured to adjust and converge the plurality of pulse light beams and ionize air in a display area to form a holographic real image.

The light field control module 2 may change directions of light beams and employ a lens to focus light beams. The energy of light beams may be converged at the focal point, which may ionize the air. Positions of ionization points may change as directions of light beams swing and the holographic real image may further be formed.

The air ionization display device in the related art employs a single pulse light source. Due to a limited power of the pulse light source, pixels of a display screen may not meet user's requirements. It is necessary to increase the pulse power output by the pulse light source if the pixels of the display screen need to increase and the sharpness of the image needs to increase.

Therefore, the air ionization display device 100 provided in embodiments of the disclosure may provide the plurality of synchronous pulse light beams by increasing the number of pulse power sources to increase the pulse-light-source energy, that is, to increase the light-source output pulse power. Therefore, the number of converged points formed by adjusting and converging of the light field control module 2 may increase, thereby increasing the pixels of the display screen and increasing the sharpness of the display screen.

In some embodiments of the disclosure, there are many ways for a pulse power module 1 to generate the plurality of synchronous pulse light beams, which will be described in different embodiments below.

In some embodiments, the pulse-light-source module 1 includes a plurality of pulse light sources and a beam combiner. The air ionization display device based on the pulse-light-source module 1 will be described below with reference to FIGS. 2 and 3.

Figure 2:
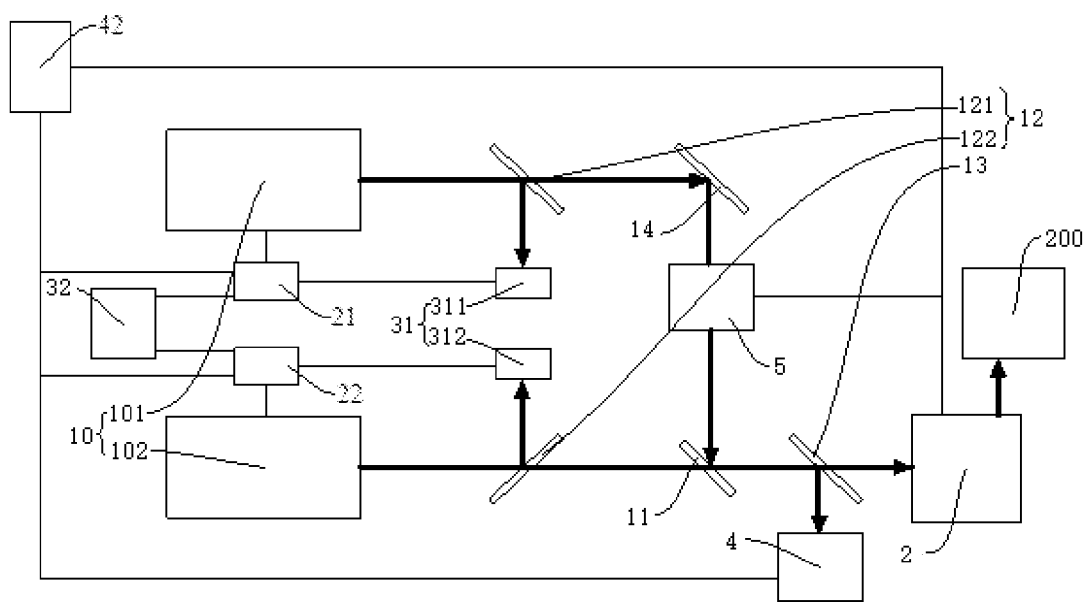
FIG. 2 is a schematic diagram of an air ionization display device with a dual-light source according to an embodiment of the disclosure.

As illustrated in FIG. 2, the pulse-light-source module 1 includes a plurality of pulse light sources 10 and a first beam combiner 11. The plurality of pulse light sources 10 are configured to generate the plurality of pulse light beams, respectively. The plurality of pulse light beams generated by the plurality of pulse light sources are all projected on the first beam combiner 11 to be combined into one light beam and the combined light beam is projected to the light field control module 2.

According to the air ionization display device 100 of embodiments of the disclosure, by increasing the number of the pulse light sources 10, that is, by providing the plurality of pulse light beams, and by using the first beam combiner 11 to combine the pulse light beams of the plurality of pulse light sources 10, it may be ensured that the pulse light beams output by the plurality of pulse light sources 10 may appear at the same position and at the same time in the display area 200 and ionize the air, which may solve the problem of space synchronization and time synchronization among the plurality of pulse light beams output by the plurality of pulse light sources 10, multiply the pixels of the air ionization display screen, improve the sharpness of the display screen and bring the good user experience.

In some embodiments, as illustrated in FIG. 2, the display device 100 further includes a first pulse-repetition-frequency adjustment component 3. The pulse-repetition-frequency adjustment component 3 may be arranged between the plurality of pulse light sources 10 and the first beam combiner 11 and configured to adjust pulse repetition frequencies of the plurality of pulse light sources 10. The first pulse-repetition-frequency adjustment component 3 is signally coupled to the plurality of pulse light sources 10 and receives pulse-repetition-frequency signals of light beams projected by the plurality of pulse light sources 10 and adjusts the plurality of pulse light sources 10 based on the received pulse-repetition-frequency signals.

The pulse repetition frequency of the pulse light source 10 refers to the number of light pulses output by the pulse light source per second. The plurality of pulse repetition frequencies of the plurality of pulses of the plurality of pulse light sources 10 may be adjusted by the first pulse-repetition-frequency adjustment component 3.

The display device requires the pulse light sources 10 with the same pulse repetition frequency. Nevertheless, the pulse output by each pulse light source will produce different pulse repetition frequency jitters due to the influence of the internal and external factors of the laser. The pulse repetition frequency of the pulse output by each pulse light source 10 is locked to the same value through the first pulse-repetition-frequency adjustment component 3.

Figure 3:
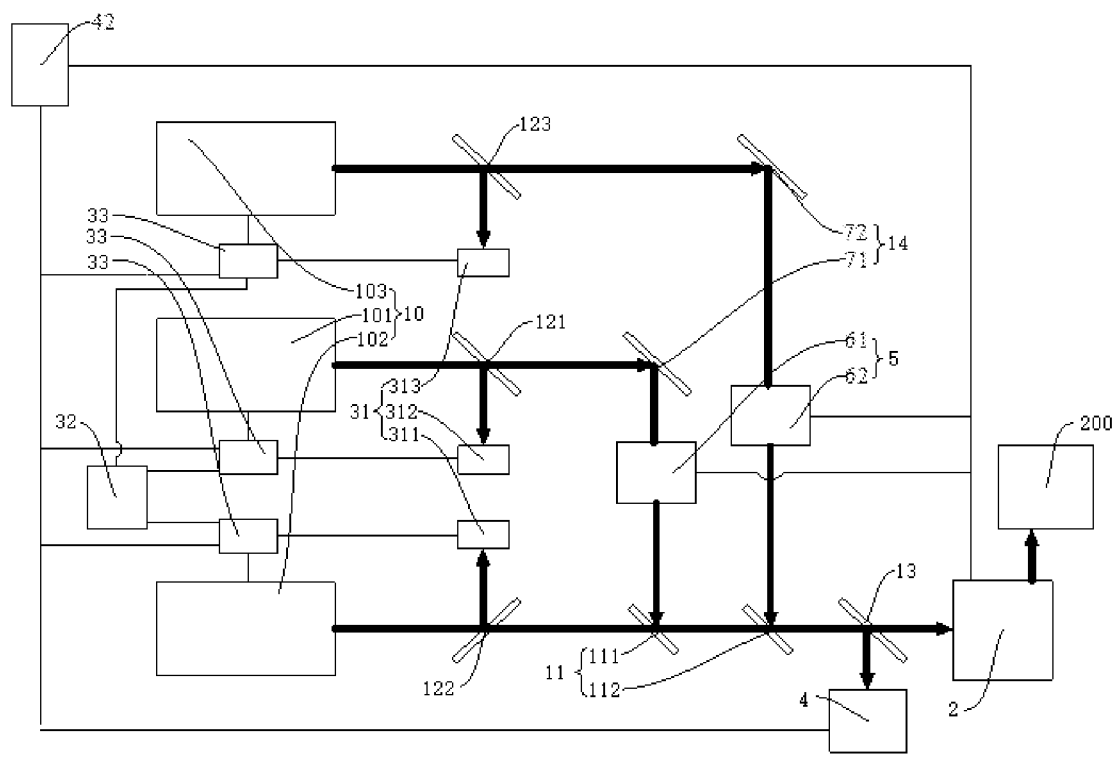
FIG. 3 is a schematic diagram of an air ionization display device with a three-light source according to an embodiment of the disclosure.

According to the air ionization display device of embodiments of the disclosure, as illustrated in FIG. 3, the first pulse-repetition-frequency adjustment component 3 includes a plurality of first photodetectors 31, a first frequency reference source 32 and a first servo controller 33.

The plurality of first photodetectors 31 are arranged one by one between the plurality of pulse light sources 10 and the first beam combiner 11 and configured to detect the pulse repetition frequencies of the plurality of pulse light sources 10. The number of first photodetectors 31 is the same as the number of pulse light sources 10. As illustrated in FIG. 2, in some embodiments, there are two pulse light sources 10 and two first photodetectors 31. The two pulse light sources 10 are a first pulse light source 101 and a second pulse light source 102. The two first photodetectors 31 are a photodetector 311 and a photodetector 312. The photodetector 311 is correspondingly arranged between the first pulse light source 101 and the first beam combiner 11 for detecting the pulse repetition frequency of the first pulse light source 101. The photodetector 312 is correspondingly arranged between the second pulse light source 102 and the first beam combiner 11 for detecting the pulse repetition frequency of the second pulse light source 102.

The first servo controller 33 is signally coupled to the plurality of first photodetectors 31, the first frequency reference source 32 and the plurality of pulse light sources 10. The first frequency reference source 32 is configured to provide a frequency reference standard for the first servo controller 33.

The first servo controller 33 is coupled to the photodetector 311, the first frequency reference source 32, the first pulse light source 101, the photodetector 312 and the second pulse light source 102. The light beam may be irradiated on the first photodetector 31 corresponding to the pulse light source 10 to generate a pulse-repetition-frequency signal. The first servo controller 33 is configured to control the pulse repetition frequency output by the pulse light source 10 based on the feedback signal of the first photodetector 31 and the reference frequency signal of the first frequency reference source 32.

In detail, after the first servo controller 33 receives the pulse repetition frequency parameter of the first pulse light source 101, fed back by the photodetector 311, it is compared with the frequency parameter provided by the first frequency reference source 32. If the pulse output by the first pulse light source 101 may not meet the parameter requirements, the first pulse light source 101 is adjusted until the pulse output by the first pulse light source 101 meets the requirements. Similarly, the first servo controller 33 adjusts based on the first frequency reference source 32 and the photodetector 312, the pulse output by the second pulse light source 102. Thus, the pulse repetition frequencies of the plurality of pulse light sources 10 may be locked at the same value and the frequency jitter is reduced.

In some embodiments, as illustrated in FIGS. 2 and 3, a plurality of first beam splitters 12 are provided between the plurality of pulse light sources 10 and the first beam combiner 11. The plurality of first beam splitters 12 are configured to reflect partial light beams of the plurality of pulse light sources 10 to the plurality of first photodetectors 31 one by one. There may be the plurality of first beam splitters 12. The plurality of first beam splitters 12 correspond to the plurality of pulse light sources 10 one by one. For example, as illustrated in FIG. 2, there may be two first beam splitters 12, namely, a first middle beam splitter 121 and a first lower beam splitter 122. The light beam generated by the first pulse light source 101 may be split into two light beams through the first middle beam splitter 121. One beam is projected on the first photodetector 311 for detecting the pulse repetition frequency of the first pulse light source 101 and another beam is projected on the first beam combiner 11. Similarly, the light beam generated by the second pulse light source 102 passes through the first lower beam splitter 122 and may be split into two light beams. One beam is projected on the photodetector 312 for detecting the pulse repetition frequency of the second pulse light source 102 and anther beam is projected on the first beam combiner 11. The first servo controller 33 adjusts actual pulse repetition frequency parameters of the first pulse light source 101 and the second pulse light source 102 based on the feedback signals of the photodetector 311 and the photodetector 312.

As illustrated in in FIG. 3, in some embodiments, there are three first beam splitters 12, namely, a first upper beam splitter 123, a first middle beam splitter 121 and a first lower beam splitter 122. There are three pulse light sources 10, namely, a first pulse light source 101, a second pulse light source 102 and a third pulse light source 103. There are three first photodetectors 31, namely, a photodetector 311, a photodetector 312 and a photodetector 313. The first middle beam splitter 121 reflects part of the light beam generated by the first pulse light source 101 to the photodetector 311. The first lower beam splitter 122 reflects part of the light beam generated by the second pulse light source 102 to the photodetector 312. The first upper beam splitter 123 reflects part of the light beam generated by the third pulse light source 103 to the photodetector 313.

In some embodiments, a transmittance of the first beam splitter 12 is A1 and 99%≤A1≤99.5%; and a reflectance of the first beam splitter 12 is A2 and 0.5%≤A2≤1%. The light beam generated by the pulse light source 10 passes through the first beam splitter 12, in which a part is reflected through the first beam splitter 12 on the first photodetector 31 for detecting the pulse repetition frequency parameter of the light beam and the other part is projected on the first beam combiner 11 by transmitting through the first beam splitter 12. When the first photodetector 31 detects the pulse repetition frequency parameter of the light beam, the energy requirement of the detected light beam is low and a small part of the light may complete the detection of the pulse repetition frequency. Therefore, the transmittance and reflectance of the first beam splitter 12 may be set within the above ranges, which may be ensured that the first photodetector 31 may detect the pulse repetition frequency of the light beam stably and accurately and may increase the proportion of the energy of the light beam irradiated on the first beam combiner 11. Most of the light beam may be irradiated on the first beam combiner 11 by transmitting through the first beam splitter 12 and then irradiated on the light field control module 2 for imaging, which is conducive to further improving the pixels of the holographic real image.

As illustrated in FIGS., in some embodiments, the display device 100 further includes a first pulse delay monitor 4 and at least one first delay line 5.

The first pulse delay monitor 4 is arranged between the first beam combiner 11 and the light field control module 2 and configured to monitor a pulse delay signal of the light beam emitted by the first beam combiner 11. Paths that the light beams generated by different pulse light sources 10 reach the first beam combiner 11 may be different. For example, the light beam generated by the second pulse light source 102 may be irradiated to the first beam combiner 11 directly and the light beam generated by the first pulse light source 101 may be irradiated to the first beam combiner 11 after one reflection. Therefore, the light beams generated by the two pulse light sources 10 have the pulse delay after being combined. The first delay line 5 is arranged between the pulse light source 10 and the first beam combiner 11 and signally coupled to the first pulse delay monitor 4, for example, which may include a delay line 61, a delay line 62 and a delay line 63 in FIGS. The pulse delay for the light beam generated by the first pulse light source 101, which is caused by the light path difference, the low pulse repetition frequency and frequency jitter, is compensated based on the feedback signal of the first pulse delay monitor 4. Therefore, it may make the two pulses synchronized in time after the beams are combined.

As illustrated in FIGS., according to some embodiments of the disclosure, when the light beams generated by the plurality of pulse light sources 10 pass through the first beam combiner 11 to form a light beam, the light beam generated by one pulse light source 10 may pass through the first beam combiner 11 and the light beams generated by the remaining pulse light sources 10 are reflected and combine with the light beam passing through the first beam combiner 11. Therefore, the light beam passing through the first beam combiner 11 may be used as a reference to adjust the light beams after reflection for merging.

At this time, the number of light beams through the reflection is one less than the number of pulse light sources 10, so the number of first delay lines 5 is one less than the number of pulse light sources 10 and the first delay lines 5 correspond to the same number of pulse light sources 10 one by one. Each first delay line 5 controls the pulse delay in the light beam generated by one pulse light source 10, so that the light beams generated by the plurality of pulse light sources 10 may be combined into a pulse light beam when passing through the first beam combiner 11 and it may make the pulse time synchronic, to avoid the situation that the air may not be ionized due to the pulse delay after the beams are combined.

As illustrated in FIG. 2 or 3, according to some embodiments of the disclosure, a second beam splitter 13 is provided between the first beam combiner 11 and the light field control module 2. The second beam splitter 13 may split the light beam generated by the first beam combiner 11 into two parts. One part is projected on the light field control module 2 by transmitting through the second beam splitter 13 and the air is ionized by the light field control module 2 to form a pattern required by the user. The other part is reflected to the first pulse delay monitor 4 through the second beam splitter 13 and the first pulse delay monitor 4 feeds back information to the controller 42 and the first delay line 5 to control the pulse delay of the output light beam of the pulse light source 10. The second beam splitter 13 may provide convenience for the first pulse delay monitor 4 to obtain the combined pulse delay information. The structure is simple and it is easy to implement.

According to some embodiments of the disclosure, a transmittance of the second beam splitter 13 is A3 and 98%≤A3≤99.5%, and a reflectance of the second beam splitter 13 is A4 and 0.5%≤A4≤2%. When the first pulse delay monitor 4 detects the delay parameter of the light beam, the energy requirement of the detected light beam is low and a small part of the light may complete the pulse delay detection. Therefore, the transmittance and reflectance of the second beam splitter 13 may be set within the above ranges, which may be ensured that the pulse delay monitor may detect the delay information of the light beam stably and accurately and may increase the proportion of the energy of the light beam irradiated on the first beam combiner 11. Most of the light may pass through the second beam splitter 13 to irradiate on the light field control module 2 for imaging, which is beneficial to further enhance the pixels of the holographic real image.

In some embodiments, there are a plurality of first beam combiners 11. As illustrated in FIG. 3, there are two first beam combiners 11, namely, a beam combiner 111 and a beam combiner 112. The number of the first beam combiners 11 may be one less than the number of the pulse light sources 10. The plurality of first beam combiners 11 are arranged at intervals along a light beam emitted by one of the plurality of pulse light sources 10 and light beams emitted by remaining pulse light sources 10 are projected on the plurality of first beam combiners 11 one by one. Light beams emitted by the plurality of pulse light sources 10 are combined into one light beam by the plurality of first beam combiners 11.

As illustrated in FIGS., the plurality of first beam combiners 11 are arranged parallel to each other. The light beam generated by one of the plurality of pulse light sources 10 passes through the plurality of first beam combiners 11 in turn for irradiating. The light beams generated by the other pulse light sources may be irradiated on the plurality of first beam combiners 11 one by one and may be combined with the light beam passing through the first beam combiners 11 under the reflection of the first beam combiners 11.

By providing the plurality of first beam combiners 11, the merging method of the plurality of pulse light sources 10 may be simplified, thereby simplifying the structural design of the air ionization display device and reducing the loss caused by the beam merging process.

As illustrated in FIG. 2 or 3, according to some embodiments of the disclosure, the air ionization display device 100 further includes a plurality of first reflecting mirrors 14. The plurality of first reflecting mirrors 14 are arranged between the plurality of pulse light sources 10 and the first beam combiner 11 and configured to reflect light beams to the first beam combiner 11 for merging. By setting the plurality of first reflecting mirrors 14, the plurality of parallel light beams may be reflected to the first beam combiner 11 and provides convenience for the arrangement of the plurality of light sources 10. Furthermore, distances among the plurality of pulse light sources 10 may be reduced, which is beneficial to reduce the overall structure of the air ionization display device.

Furthermore, as illustrated in FIG. 3, the number of the first reflecting mirrors 14 is one less than the number of the pulse light sources 10. For example, in FIG. 2, there is one first reflecting mirror 14. In FIG. 3, there are two first reflecting mirrors 14, namely, a first 71 of the first reflecting mirrors and a second 72 of the first reflecting mirrors. In the plurality of pulse light sources 10, the light beam generated by one pulse light source 10 passes through the first beam combiner 11 and the light beams generated by the other pulse light sources 10 pass through the reflection of the first beam combiner 11 and are combined with the light beam passing through the first beam combiner 11. The light beam passing through the first beam combiner 11 may not need a reflection structure and be directly irradiated on the first beam combiner 11. The light beams generated by the other pulse light sources 10 may be irradiated on the first beam combiner 11 by the reflection of the first beam combiner 11. Therefore, one first reflecting mirror 14 may be reduced and the structural design of the air ionization display device 100 may be further simplified.

In some embodiments, pulse repetition frequencies of the plurality of pulse light sources 10 are the same, pulse widths of the plurality of pulse light sources 10 are within 50 fs-100 ns, pulse energies of the plurality of pulse light sources 10 are within 20 μJ-10 mJ, and the pulse repetition frequencies of the plurality of pulse light sources 10 are within 500 Hz-10 MHz. This may improve the imaging effect and pixels of the holographic real image.

According to the air ionization display device 100 of embodiments of the disclosure, the light field control module 2 includes a galvanometer assembly, a lens assembly and a spatial light modulator. The output light beam of the first beam combiner 11 is projected on the galvanometer assembly. The galvanometer assembly may include two sets of reflecting mirrors arranged vertically. The two sets of reflecting mirrors swing in the front-rear direction and in the left-right direction respectively, so as to control the irradiation path of the light beam. The light beam emitted from the galvanometer assembly is projected on the lens assembly and the lens assembly focuses the beam. After the beam is concentrated at the focal position of the lens assembly, the power density increases, reaching the ionization power threshold. The high-power laser ionizes air molecules to form highlights finally and to form the real image that the user needs.

The spatial light modulator is arranged between the first beam combiner 11 and the galvanometer assembly and achieves the purpose of light wave modulation by modulating amplitude, phase, polarization state and other parameters of the light. The light beam passes through the spatial light modulator to modulate the light field to form a plurality of focus points, thus increasing the pixels of the display screen.

The lens assembly may include a zoom lens and a flat field focusing lens. The zoom lens is arranged between the flat field focusing lens and the galvanometer assembly. The laser pulse output by the high-power pulse light source may be modulated for the light field by the spatial light modulator and then is reflected to the galvanometer assembly to adjust its emission direction. The light beam passes through the zoom lens and the flat field focusing lens and then focuses to a designated point in the air ionization area. Finally, the high-power laser ionizes the air molecules to form the bright spots.

The zoom lens may adjust the distance between the focus and the zoom lens based on the imaging requirements. The real image of the three-dimensional structure may be produced by adjusting the focus position. The use of the flat field focus lens and the zoom lens may prevent the real image from bending and deformation during the imaging process. The controller 42 actively controls the spatial light modulator, the galvanometer assembly and the lens assembly, and adjusts the position of the laser ionization point and the pixels of the displayed image based on the image to be displayed.

In other embodiments, the pulse-light-source module 1 generates a plurality of synchronous pulse light beams through light splitting and combining with the beam combiner. The air ionization display device based on the pulse-light-source module 1 will be described below with reference to FIG. 4.

Figure 4:
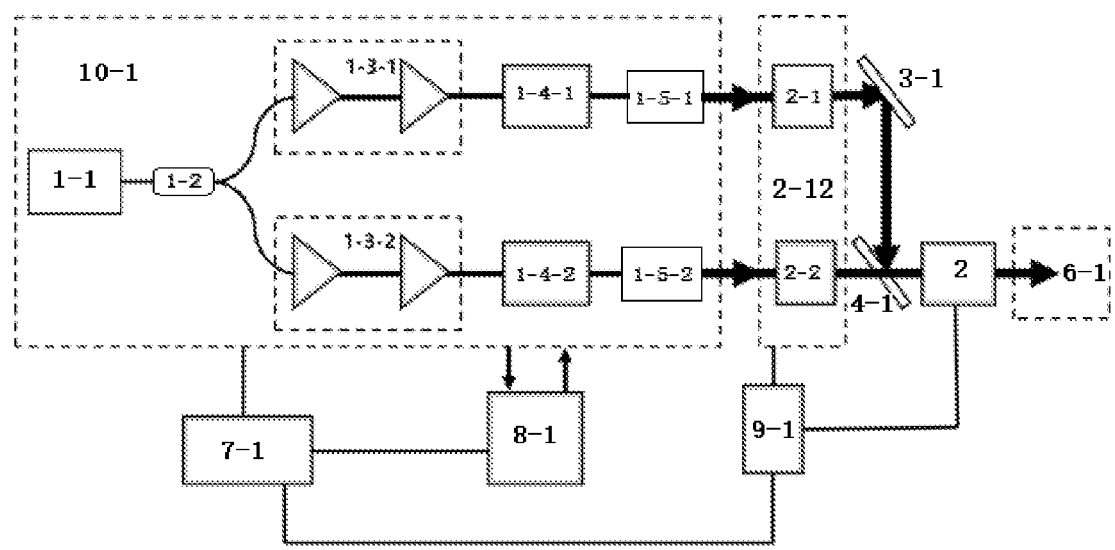
FIG. 4 is a schematic diagram of an air ionization display device with two sub-beams according to an embodiment of the disclosure.

As illustrated in FIG. 4, the air ionization display device 100 of embodiments of the disclosure includes a pulse seed source 1-1, a light splitting coupler 1-2, a second beam combiner 4-1, a light field control module 2, a plurality of pulses amplification modules and a plurality of second delay lines 2-12.

In detail, the pulse seed source 1-1 may generate a pulse light beam. The light splitting coupler 1-2 may be arranged along an optical path of the pulse light beam and adjacent to the pulse seed source 1-1 and split the pulse light beam into a plurality of sub-beams. The pulse light beam is irradiated on the light splitting coupler 1-2 and divided into the plurality of sub-beams. The energy of the plurality of sub-beams may be evenly distributed.

The plurality of sub-beams are all projected on the second beam combiner 4-1 after transmission and reflection and combined into one beam. The light beam combined by the second beam combiner 4-1 may be projected on the light field control module 2. The light field control module 2 adjusts and converges the light beam and ionizes the air in the display area 6-1 to form a real image.

The light field control module 2 may change directions of light beams and employ a lens to focus light beams. The energy of light beams may be converged at the focal point, which may ionize the air. Positions of ionization points may change as directions of light beams swing and the holographic real image may further be formed.

The air ionization display device in the related art employs a scheme of direct ionization of the pulse light beam output by the pulse seed source 1-1 without splitting. Due to a limited power of the pulse light source, pixels of a display screen may not meet user's requirements. It is necessary to increase the pulse power output by the pulse light source if the pixels of the display screen need to increase and the sharpness of the image needs to increase. Because in the related art it is difficult to greatly increase the pulse power of the pulse light source in the case of the single beam output by the pulse light source, it is difficult to increase the pixels of the display screen of the air ionization display device.

Therefore, according to the air ionization display device 100 of embodiments of the disclosure, the pulse light beam generated by the pulse seed source 1-1 is divided into the plurality of sub-beams by the light splitting coupler 1-2. The second beam combiner 4-1 is configured to combine the plurality of sub-beams. It may be ensured that the plurality of pulses in the plurality of sub-beams may appear at the same position and at the same time in the display area 6-1 and ionize the air, which solves the problem of space synchronization and time synchronization among the plurality of pulses in the plurality of sub-beams. The pixels of the air ionization display screen may be multiplied, which may bring the good user experience.

According to the air ionization display device 100 of embodiments of the disclosure, the plurality of pulse amplification modules are arranged along optical paths of the plurality of sub-beams one by one and configured to amplify pulses of the plurality of sub-beams and arranged between the second beam combiner 4-1 and the light splitting coupler 1-2. By setting the pulse amplification modules, the pulse energy of the sub-beams may be increased and the imaging quality and brightness during imaging may be improved.

According to an embodiment of the disclosure, as illustrated in FIG. 4, the plurality of second delay lines 2-12 are arranged along optical paths of the plurality of sub-beams one by one. The plurality of second delay lines 2-12 are arranged between the plurality of pulse amplification modules and the second beam combiner 4-1 and configured to adjust pulse time positions of the plurality of sub-beams so that a plurality of pulses in the plurality of sub-beams coincide in time after the plurality of sub-beams pass through the second beam combiner 4-1.

As illustrated in FIG. 4, in some embodiments, there are a plurality of second beam combiners 4-1. The number of the second beam combiners 4-1 is one less than the number of the sub-beams. The plurality of second beam combiners 4-1 are arranged at intervals along one of the plurality of sub-beams and this beam pass through the plurality of second beam combiners 4-1 in turn and may be irradiated out. The remaining sub-beams are projected on the plurality of second beam combiners 4-1 one by one and combined with the sub-beam passing through the second beam combiner 4-1 into a light beam under the reflection of the second beam combiners 4-1.

By arranging the plurality of second beam combiners 4-1, the manner of merging the plurality of sub-beams may be simplified, thereby simplifying the structural design of the air ionization display device 100 and reducing the loss caused by the beam merging process at the same time.

As illustrated in FIG. 4, according to an embodiment of the disclosure, the air ionization display device 100 further includes a plurality of second reflecting mirrors 3-1. The plurality of second reflecting mirrors 3-1 are arranged between the plurality of second delay lines 2-12 and the plurality of second beam combiners 4-1 one by one and configured to reflect the plurality of sub-beams to the plurality of second beam combiners 4-1 for merging. By providing the second reflecting mirrors 3-1, the plurality of sub-beams arranged in parallel may be reflected to the second beam combiners 4-1, which is beneficial to reduce the overall structure of the air ionization display device 100.

Furthermore, as illustrated in FIG. 4, the number of the second reflecting mirrors 3-1 is the same as the number of the sub-beams. In the plurality of sub-beams, one of the sub-beams passes through the second beam combiners 4-1 and the other sub-beams pass through the reflection of the second beam combiners 4-1 and combined with the light beam passing through the second beam combiners 4-1. The light beam passing through the second beam combiners 4-1 may not require a reflection structure and may be directly irradiated on the second beam combiners 4-1. The remaining sub-beams are irradiated on the second beam combiners 4-1 through the reflection of the second reflecting mirrors 3-1. As a result, one second reflecting mirror 3-1 may be reduced and the structural design of the air ionization display device 100 may be further simplified.

According to an embodiment of the disclosure, the air ionization display device 100 further includes a plurality of pulse compression devices. The plurality of pulse compression devices are arranged along the optical paths of the plurality of sub-beams one by one. The plurality of pulse compression devices are arranged between the plurality of pulse amplification modules and the plurality of second delay lines 2-12. That is, in the forward direction of the sub-beams, the pulse compression devices are arranged between the pulse amplification modules and the second delay lines 2-12. The pulse compression device is configured to compress the pulse width of the sub-beam to increase the pulse light peak power of the sub-beam.

As illustrated in FIG. 4, there are two pulse compression devices, namely, a first pulse compression device 1-4-1 and a second pulse compression device 1-4-2. The first pulse compression device 1-4-1 is arranged on the first sub-beam. The second pulse compression device 1-4-2 is arranged on the second sub-beam. By arranging the pulse compression devices on the sub-beams, pulse light peak powers of the sub-beams may be increased and then the pulse peak power after the beam is focused may be increased, which is beneficial to improve the imaging effect.

According to an embodiment of the disclosure, the air ionization display device 100 further includes a plurality of beam collimating devices. The plurality of beam collimating devices are arranged along optical paths of the plurality of sub-beams one by one. The plurality of beam collimating devices are arranged between the plurality of pulse compression devices and the plurality of second delay lines 2-12 and configured to adjust the plurality of sub-beams into a plurality of collimated beams that satisfy an ionization threshold. In other words, the optical path of each sub-beam is provided with one beam collimating device. In the forward direction of the sub-beams, the beam collimating devices are arranged between the pulse compression devices and the second delay lines 2-12 on the optical path of the sub-beams. After the sub-beams pass through the beam collimation devices, it may be adjusted to collimated beams that meets the ionization threshold.

As illustrated in FIG. 4, there are two beam collimating devices, namely, a first beam collimating device 1-5-1 and a second beam collimating device 1-5-2. The first beam collimating device 1-5-1 is set on the first sub-beam. The second beam collimator 1-5-2 is set on the second sub-beam. By arranging the beam collimating device on the sub-beam, the beam collimating device may be configured to adjust beam parameters of the sub-beam to ensure that the sub-beam meets the ionization threshold requirement, thereby improving the ionization imaging effect.

According to an embodiment of the disclosure, the air ionization display device 100 further includes a water-cooled radiator 8-1. The water-cooled radiator 8-1 is connected to the pulse seed source 1-1, the light splitting coupler 1-2, the pulse amplification modules, the pulse compression devices, and the beam collimating devices and configured to dissipate heat for the pulse seed source 1-1, the light splitting coupler 1-2, the pulse amplification modules, the pulse compression devices, and the beam collimating devices.

Since the pulse seed source 1-1 generates a high-energy pulse light source, and this light beam passes through the light splitting coupler 1-2, the pulse amplification modules, the pulse compression devices, and the beam collimating devices in sequence, the pulse seed source 1-1, beam splitter 1-2, the pulse seed source 1-1, the light splitting coupler 1-2, the pulse amplification modules, the pulse compression devices, and the beam collimating devices may produce heat when working. By setting the water-cooled radiator 8-1, the heat may be dissipated for the pulse seed source 1-1, the light splitting coupler 1-2, the pulse amplification modules, the pulse compression devices, and the beam collimating devices. It may prevent the excessive concentration of heat on the pulse seed source 1-1, the light splitting coupler 1-2, the pulse amplification modules, the pulse compression devices, and the beam collimating devices from causing damage to the device. In addition, the water-cooling radiator 8-1 may adjust the heat dissipation area by adjusting the flow direction of the water path, which has strong controllability and may dissipate heat for devices at the same time. The cost of water cooling is low, the effect is good and it may meet the heat dissipation requirement of the air ionization display device.

According to an embodiment of the disclosure, the air ionization display device 100 further includes a pulse-light-source housing 10-1, a temperature sensor and a controller 7-1.

The pulse seed source 1-1, the light splitting coupler 1-2, the pulse amplification modules, the pulse compression devices, and the beam collimating devices are all arranged in the pulse-light-source housing 10-1. The pulse-light-source housing 10-1 is provided with a plurality of light exit ports for the plurality of sub-beams to pass through. That is, the outer covers of the pulse seed source 1-1, the light splitting coupler 1-2, the pulse amplification modules, the pulse compression devices, and the beam collimating devices are provided with the pulse-light-source housing 10-1. The outer covers of the pulse seed source 1-1, the light splitting coupler 1-2, the pulse amplification modules, the pulse compression devices, and the beam collimating devices are sheathed with the pulse-light-source housing 10-1 and the pulse-light-source housing 10-1 is provided with the light exit ports. The pulse-light-source housing 10-1 is configured to protect the pulse seed source 1-1, the light splitting coupler 1-2, the pulse amplification modules, the pulse compression devices, and the beam collimating devices from damage and the structure is simple and may not affect the beam normal transmission.

The temperature sensor is arranged in the pulse-light-source housing 10-1 and configured to detect temperature inside the pulse-light-source housing 10-1. The controller 7-1 is signally coupled to the temperature sensor and the water-cooled radiator 8-1 and configured to control the temperature inside the pulse-light-source housing 10-1.

By setting the temperature sensor in the pulse-light-source housing 10-1, the temperature sensor may be configured to detect the temperature of the pulse-light-source housing 10-1 and feed the temperature information back to the controller 7-1. The controller 7-1 controls the water-cooled radiator 8-1 to dissipate for the devices in the pulse light source housing 10-1 to provide a stable and good working environment for the devices in the pulse light source housing 10-1.

According to an embodiment of the disclosure, the controller 7-1 is coupled signally to the pulse seed source 1-1, the light splitting coupler 1-2, the pulse amplification modules, the pulse compression devices, and the beam collimating devices and configured to control output parameters of the plurality of sub-beams. That is, the controller 7-1 may also control the pulse seed source 1-1, the light splitting coupler 1-2, the pulse amplification modules, the pulse compression devices, and the beam collimating devices and adjust the output parameters of the sub-beams based on the working status of the pulse seed source 1-1, the light splitting coupler 1-2, the pulse amplification modules, the pulse compression devices, and the beam collimating devices to ensure that the sub-beams meets the ionization imaging requirements.

According to an embodiment of the disclosure, the air ionization display device 100 further includes a computer 9-1, which is signally coupled to the second delay lines 2-12, the light field control module 2 and the controller 7-1 and configured to control the working status of each module of the air ionization display device 100 in time to provide a guarantee for the stable operation of the device.

According to an embodiment of the disclosure, the pulse amplification module includes a pre-amplification module and a main amplification module, and the pre-amplification module is located between the main amplification module and the light splitting coupler 1-2. In other words, the pulse amplification module consists the pre-amplification module and the main amplification module. The sub-beam first passes through the pre-amplification module and then passes through the main amplification module, which may improve the amplification effect of the pulse amplification module on the sub-beam.

According to an embodiment of the disclosure, pulse widths of the plurality of sub-beams are within 10 fs-100 ns, pulse energies of the plurality of sub-beams are within 10 µJ-100 mJ, and pulse repetition frequencies of the plurality of sub-beams are within 50 Hz-10 MHz.

According to the air ionization display device 100 of embodiments of the disclosure, the light field control module 2 includes a galvanometer assembly, a lens assembly and a spatial light modulator. The output light beam of the second beam combiner 4-1 is projected on the galvanometer assembly. The galvanometer assembly may include two sets of reflecting mirrors arranged vertically. The two sets of reflecting mirrors swing in the front-rear direction and in the left-right direction respectively, so as to control the irradiation path of the light beam. The light beam emitted from the galvanometer assembly is projected on the lens assembly and the lens assembly focuses the beam. After the beam is concentrated at the focal position of the lens assembly, the power density increases, reaching the ionization power threshold. The high-power laser ionizes air molecules to form highlights finally and to form the real image that the user needs.

The spatial light modulator is arranged between the second beam combiner 4-1 and the galvanometer assembly and achieves the purpose of light wave modulation by modulating amplitude, phase, polarization state and other parameters of the light. The light beam passes through the spatial light modulator to modulate the light field to form a plurality of focus points, thus increasing the pixels of the display screen.

The lens assembly may include a zoom lens and a flat field focusing lens. The zoom lens is arranged between the flat field focusing lens and the galvanometer assembly. The laser pulse output by the high-power pulse light source may be modulated for the light field by the spatial light modulator and then is reflected to the galvanometer assembly to adjust its emission direction. The light beam passes through the zoom lens and the flat field focusing lens and then focuses to a designated point in the air ionization area. Finally, the high-power laser ionizes the air molecules to form the bright spots.

The zoom lens may adjust the distance between the focus and the zoom lens based on the imaging requirements. The real image of the three-dimensional structure may be produced by adjusting the focus position. The use of the flat field focus lens and the zoom lens may prevent the real image from bending and deformation during the imaging process. The computer 9-1 actively controls the spatial light modulator, the galvanometer assembly and the lens assembly, and adjusts the position of the laser ionization point and the pixels of the displayed image based on the image to be displayed.

In other embodiments of the disclosure, the pulse-light-source module 1 uses the plurality of pulse light sources and defines the pulse energy of the pulse light sources. The air ionization display device 100 based on the pulse-light-source module 1 of the disclosure will be described below with reference to FIGS. 5 and 6.

The air ionization display device 100 according to an embodiment of the disclosure includes a plurality of pulse light sources 10. A pulse energy of each of the plurality of pulse light sources 10 is less than an air ionization threshold and a sum of the pulse energy of each of the plurality of pulse light sources 10 is greater than the air ionization threshold. Most of the light beams generated by the light sources 10 are projected to the light field control module 2 and the light field control module 2 adjusts and converges the plurality of pulse light beams and ionizes the air at a designated position in the display area to form a holographic real image.

The pulse power density of each pulse light source 10 is relatively small and less than the air ionization threshold. The single beam generated by the pulse light source 10 may not ionize the surrounding air during the projection process and the plurality of low-power pulse light sources 10 are matched with each other to irradiate on the same point. The laser power density at the intersection of the plurality of light beams may be superimposed to exceed the air ionization threshold. The air at the intersection is ionized to form a holographic real image.

Therefore, according to the air ionization display device 100 of embodiments of the disclosure, the plurality of pulse light sources 10 are used to increase the laser power density at the beam intersection point and then the air may be ionized at the beam intersection point to form a holographic real image, which may reduce the specification requirements of the single pulse light source 10, greatly reduce the manufacturing cost of the air ionization display device 100, eliminate the lens assembly in the conventional air ionization display device 100 and also simplify the structure design of the air ionization display device 100.

Figure 5:
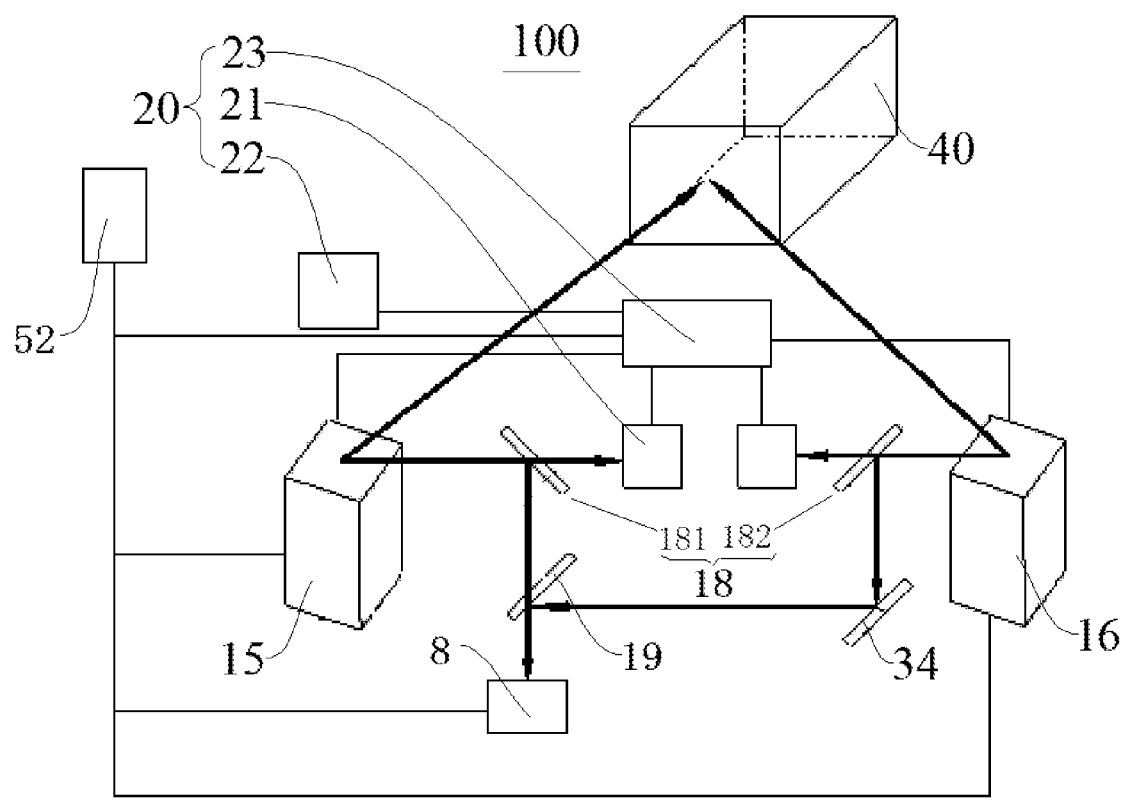
FIG. 5 is a schematic diagram of an air ionization display device according to an embodiment of the disclosure.

As illustrated in FIG. 5, in some embodiments, the air ionization display device 100 further includes a second pulse-repetition-frequency adjustment component 20. The second pulse-repetition-frequency adjustment component 20 is arranged between the plurality of pulse light sources 10 and the display area and configured to adjust pulse repetition frequencies of the plurality of pulse light sources 10. The second pulse-repetition-frequency adjustment component 20 is signally coupled to the plurality of pulse light sources 10 and may receive the pulse-repetition-frequency signals of the light beams projected by the plurality of pulse light sources 10 and adjust the plurality of pulse light sources 10 based on the received pulse-repetition-frequency signals.

The pulse repetition frequency of the pulse light source 10 refers to the number of trigger pulses generated by the pulse light source 10 per second. The plurality of pulse repetition frequencies of the plurality of light beams emitted by the plurality of pulse light sources 10 may be adjusted by the second pulse-repetition-frequency adjustment component 20.

According to the air ionization display device 100 of embodiments of the disclosure, the second pulse-repetition-frequency adjustment component 20 includes a plurality of second photodetectors 21, a second frequency reference source 22 and a second servo controller 23.

There are the plurality of second photodetectors 21. The number of the second photodetectors 21 is the same as the number of the pulse light sources 10. The plurality of second photodetectors 21 are arranged one by one between the plurality of pulse light sources 10 and the display area and configured to detect the pulse repetition frequencies of the plurality of pulse light sources 10. As illustrated in FIG. 5, in some embodiments, there are two pulse light sources 10 and two second photodetectors 21. The two pulse light sources 10 are a first pulse light source 15 and a second pulse light source 16. The first of the second photodetectors 21 is correspondingly arranged between the first pulse light source 15 and the display area for detecting the pulse repetition frequency of the output light beam of the first pulse light source 15. The second of the second photodetectors 21 is correspondingly arranged between the second pulse light source 16 and the display area for detecting the pulse repetition frequency of the output light beam of the second pulse light source 16.

The second servo controller 23 is signally coupled to the plurality of second photodetectors 21, the second frequency reference source 22 and the plurality of pulse light sources 10. The second frequency reference source 22 is configured to provide a frequency reference standard for the second servo controller 23. The frequency standard parameter of the required frequency is set in the second frequency reference source 22 in advance. After the device is started, the frequency parameter output by the second frequency reference source 22 is used as the frequency standard for the second servo controller 23.

The second servo controller 23 is signally coupled to the first of the second photodetectors, the second frequency reference source 22, the first pulse light source 15, the second of the second photodetectors and the second pulse light source 16. The light beam is irradiated on the second photodetector 21 corresponding to the pulse light source 10 and may generate feedback information. The second servo controller 23 is configured to control the pulse repetition frequencies of the plurality of pulse light sources 10 based on feedback information of the plurality of second photodetectors 21 and feedback information of the second frequency reference source 22.

In detail, after the second servo controller 23 receives the pulse repetition frequency parameter of the light beam emitted by the first pulse light source 15, fed back by the first second photodetector 21, it is compared with the frequency parameter provided by the second frequency reference source 22. If the output light beam of the first pulse light source 15 does not meet the parameter requirements, the first pulse light source 15 is adjusted until the output light beam of the first pulse light source 15 meets the requirements. Similarly, the second servo controller 23 may adjust the pulse repetition frequency parameter of the light beam output by the second pulse light source 16 based on the second frequency reference source 22 and the second photodetector 21.

Figure 6:
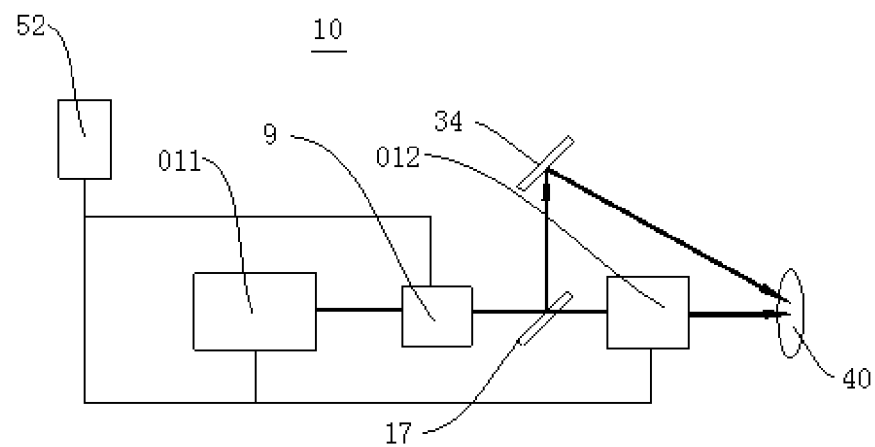
FIG. 6 is a schematic diagram of a pulse light source according to an embodiment of the disclosure.

As illustrated in FIG. 6, a plurality of third beam splitters 17 are provided between the plurality of pulse light sources 10 and the display area and configured to reflect partial light beams of the plurality of pulse light sources 10 to the plurality of second photodetectors 21 one by one. The third beam splitter 17 correspondingly reflects part of the light beam of the first pulse light source 15 to the first second photodetector 21. The light beam generated by the first pulse light source 15 may be split into two beams through the third beam splitter 17. One beam is projected on the second photodetector 21 to detect the pulse repetition frequency of the light beam generated by the first pulse light source 15 and the other beam is projected on the display area for ionization imaging. Similarly, the light beam generated by the second pulse light source 16 may be split into two beams through the third beam splitter 17. One beam is projected on the second photodetector 21 for detecting the pulse repetition frequency of the light beam generated by the second pulse light source 16 and the other beam is projected on the display area for ionization imaging. The second servo controller 23 adjusts the pulse repetition frequency parameters of the first pulse light source 15 and the second pulse light source 16 based on the feedback information of the first of the second photodetectors 21 and the second of the second photodetectors 21.

In some embodiments, a transmittance of the third beam splitter 17 is A1 and 99%≤A1≤99.5%. A reflectance of the third beam splitter 17 is A2 and 0.5%≤A2≤1%. The light beam generated by the pulse light source 10 passes through the third beam splitter 17. One part is used for the photodetector for detecting frequency parameters. The other part is used for imaging. When the second photodetector 21 detects the pulse repetition frequency parameter of the light beam, the pulse repetition frequency detection may be completed with the less-energy light beam. Therefore, setting the transmittance and reflectance of the third beam splitter 17 within the above range may ensure that the photodetector may detect the pulse repetition frequency of the light beam stably and accurately and increase the proportion of the pulse energy used for imaging to the total pulse energy, so that most of the light beams passes through the beam splitter for imaging.

According to some embodiments of the disclosure, each pulse light source 10 includes a pulse generator 011. The pulse generator 011 is configured to generate a pulse light beam. The plurality of pulse light sources 10 generate the plurality of pulse light beams synchronously. The light field control module 2 may include a plurality of light field regulators 012 corresponding to the plurality of pulse light sources 10 one by one. The light field regulator 012 is arranged between the corresponding pulse light source 011 and the display area. The pulse light beam generated by the pulse generator 011 is irradiated on the light field regulator 012 and is projected on the display area through the light field regulator. The third beam splitter 17 is arranged between the corresponding pulse generator 011 and light field regulator 012.

The light beam generated by the pulse generator 011 passes through the light field regulator 012. The light field regulator 012 regulates the light beam generated by the pulse generator 011 and then may control the direction of the light beam, thereby controlling the light beams generated by the plurality of pulse generators 011 to converge in the imaging area 40 and ionize the air at the junction to form a real image, which is used to form a holographic real image at a specific position as required.

The third beam splitter 17 is arranged between the pulse generator 011 and the light field regulator 012. Since the direction of the light beam emitted from the pulse generator 011 to the light field regulator 012 is fixed, it may provide the convenience for the third beam splitter 17 to separate the light beam, preventing the projection direction of the light beam from swinging to affect the light splitting effect and ensuring that the second photodetector 21 may always detect the light beam.

According to some embodiments of the disclosure, the pulse-light-source module 1 further includes a second pulse delay monitor 8 and third delay lines 9. The second pulse delay monitor 8 is arranged between the plurality of pulse light sources 10 and the display area. The second pulse delay monitor 8 is configured to monitor pulse delay signals of the plurality of pulse light sources 10. The second pulse delay monitor 8 inputs the monitored pulse delay signals to the controller 52 to drive the third delay lines 9 to control the pulse delays generated by the plurality of pulse light sources 10. Therefore, the plurality of pulse lights may be simultaneously projected to the display area.

The third delay lines 9 are arranged between the plurality of pulse generators 011 and the plurality of light field regulators 012 and signally coupled to the second pulse delay monitor 8 and configured to compensate pulse delays of light beams emitted by the plurality of pulse light sources 10 based on feedback information of the second pulse delay monitor 8.

The output pulse delay information of the pulse light source 10 may be monitored and adjusted by setting the second pulse delay monitor 8 and the third delay line 9, so as to ensure that the pulses generated by the pulse light sources 10 are synchronized in time at the intersection and the air ionization display device 100 completes air imaging.

According to some embodiments of the disclosure, the number of the third delay lines 9 is the same as the number of the pulse light sources 10. The plurality of third delay lines are corresponding to the plurality of pulse light sources 10 one by one. By setting the plurality of third delay lines 9, the time compensation may be performed on the output pulse of each pulse light source 10 to prevent the pulses generated by the pulse light sources 10 from being inconsistent in delays to cause the air molecules at the intersection of the pulses to fail to reach the ionization threshold and fail to ionize.

As illustrated in FIG. 5, according to some embodiments of the disclosure, a fourth beam splitter 18 is provided between the third beam splitter 17 and the second photodetector 21. The fourth beam splitter 18 reflects part of the reflected light beam from the third beam splitter 17 on the second pulse delay monitor 8. In other words, the light beam generated by the pulse light source 10 first passes through the third beam splitter 17. A part of the beam passes through the third beam splitter 17 and is projected on the imaging area 40 for imaging. The other part of the beam may be irradiated on the second photodetector 21. The beam irradiated on the second photodetector 21 passes through the fourth beam splitter 18. A part of the beam passes through the fourth beam splitter 18 and is irradiated on the second photodetector 21 for detecting the pulse repetition frequency signal and the other part is irradiated on the second pulse delay monitor 8 for monitoring the delay information of the pulse. Therefore, various parameters of the pulse light source 10 may be accurately detected.

According to some embodiments of the disclosure, there are a plurality of fourth beam splitters 18. A third beam combiner 19 is provided between one fourth beam splitter 18 and the second pulse delay monitor 8. Third reflecting mirrors 34 may be provided between the remaining fourth beam splitters 18 and the third beam combiner 19. The third reflecting mirror 34 is configured to reflect the light beam reflected by the fourth beam splitter 18 to the third beam combiner 19.

As illustrated in FIG. 5, there are two fourth beam splitters 18, which are a front fourth beam splitter 181 and a rear fourth beam splitter 182, respectively. The third beam combiner 19 is provided between the front fourth beam splitter 181 and the second pulse delay monitor 8. The third reflecting mirror 34 is provided between the third beam combiner 19 and the rear fourth beam splitter 182. The third reflecting mirror 34 is configured to irradiate the light beam separated by the rear fourth beam splitter 182 to the third beam combiner 19. The third beam combiner 19 is configured to combine the light beams separated by the front fourth beam splitter 181 and the rear fourth beam splitter 182 and send them to the second pulse delay monitor 8.

In some embodiments, there are three fourth beam splitters 18, namely, a front fourth beam splitter, a middle fourth beam splitter and a rear fourth beam splitter. There are two third reflecting mirrors 34, namely, a first of the third reflecting mirrors and a second of the third reflecting mirrors. A third beam combiner 19 is provided between the front fourth beam splitter and the second pulse delay monitor 8. The first of the third reflecting mirrors is provided between the middle fourth beam splitter and the third beam combiner 19. The first of the third reflecting mirrors is configured to irradiate the light beam separated by the middle fourth beam splitter to the third beam combiner 19. The second of the third reflecting mirrors is provided between the rear fourth beam splitter and the third beam splitter 19. The second of the third reflecting mirrors is configured to irradiate the light beam separated by the rear fourth beam splitter to the third beam combiner 19. The third beam combiner 19 combines the light beams separated by the front fourth beam splitter 18, the middle fourth beam splitter 18 and the rear fourth beam splitter 18 and sends them to the second pulse delay monitor 8.

By arranging the third beam combiners 19 and the third mirrors 34, one second pulse delay monitor 8 may be used to monitor the delay information of the plurality of light beams and the working efficiency of the second pulse delay monitor 8 may be improved. The structural design of the air ionization display device 100 is simplified.

In some embodiments, pulse repetition frequencies of the plurality of pulse light sources 10 are the same, pulse widths of the plurality of pulse light sources 10 are within 50 fs-100 ns, pulse energies of the plurality of pulse light sources 10 are within 20 µJ-10 mJ, and the pulse repetition frequencies of the plurality of pulse light sources 10 are within 500 Hz-10 MHz.

In the description of the disclosure, "a first feature" and "a second feature" may include one or more of these features.

In the description of the disclosure, "plurality" means two or more.

In the description of the disclosure, a first feature "above" or "below" a second feature, which may include the first feature and the second features in direct contact, or not in direct contact but through another feature contact between them.

In the description of the disclosure, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature.

Reference throughout this specification to "an embodiment," "some embodiments," "one embodiment", "another example," "an example," "a specific example," or "some examples," means that a particular feature, structure, material, or characteristic described in connection with the embodiments or examples is included in at least one embodiments or examples of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiments or examples of the disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. An air ionization display device, comprising:
   a pulse-light-source module configured to generate a plurality of synchronous pulse light beams; and
   a light field control module, the plurality of pulse light beams being projected to the light field control module and the light field control module being configured to adjust and converge the plurality of pulse light beams and ionize air in a display area to form a holographic real image,
   wherein the pulse-light-source module comprises:
   a plurality of pulse light sources configured to generate the plurality of pulse light beams, respectively; and
   a first beam combiner, the plurality of pulse light beams generated by the plurality of pulse light sources being projected on the first beam combiner to combined into one light beam and the combined light beam being projected to the light field control module,
   wherein the air ionization display device further comprises:
   a first pulse-repetition-frequency adjustment component, arranged between the plurality of pulse light sources and the first beam combiner and configured to adjust pulse repetition frequencies of the plurality of pulse light sources.

2. The device as claimed in claim 1, wherein the first pulse-repetition-frequency adjustment component comprises:
   a plurality of first photodetectors, arranged one by one between the plurality of pulse light sources and the first beam combiner and configured to detect the pulse repetition frequencies of the plurality of pulse light sources;
   a first frequency reference source configured to provide a frequency reference standard; and
   a first servo controller, signally coupled to the plurality of first photodetectors, the first frequency reference source and the plurality of pulse light sources and configured to control the pulse repetition frequencies of the plurality of pulse light sources based on pulse-repetition-frequency signals received by the plurality of first photodetectors and a reference frequency of the first frequency reference source.

3. The device as claimed in claim 2, wherein a plurality of first beam splitters are provided between the plurality of pulse light sources and the first beam combiner and configured to reflect partial light beams of the plurality of pulse light sources to the plurality of first photodetectors one by one.

4. The device as claimed in claim 1, further comprising:
   a first pulse delay monitor, arranged between the first beam combiner and the light field control module and configured to monitor a pulse delay signal of the beam emitted by the first beam combiner; and
   at least one first delay line, arranged between the plurality of pulse light sources and the first beam combiner, signally coupled to the first pulse delay monitor and configured to compensate pulse delays of beams output from the plurality of pulse light sources based on feedback information of the first pulse delay monitor.

5. The device as claimed in claim 4, wherein a number of the at least one first delay line is one less than a number of the plurality of pulse light sources and the at least one first delay line is corresponding to the same number of pulse light sources one by one.

6. The device as claimed in claim 5, wherein a second beam splitter is provided between the first beam combiner and the light field control module and configured to reflect partial light beam emitted by the first beam combiner to the first pulse delay monitor.

7. The device as claimed in claim 1, wherein there are a plurality of first beam combiners, a number of the plurality of first beam combiners is one less than a number of the plurality of pulse light sources, the plurality of first beam combiners are arranged at intervals along a light beam emitted by one of the plurality of pulse light sources, light beams emitted by remaining pulse light sources are projected on the plurality of first beam combiners one by one, and light beams emitted by the plurality of pulse light sources are combined into one light beam.

8. The device as claimed in claim 1, further comprising:
   a plurality of first reflecting mirrors, arranged between the plurality of pulse light sources and the first beam combiner and configured to reflect light beams transmitted by the plurality of pulse light sources to the first beam combiner.

9. The device as claimed in claim 1, wherein the pulse-light-source module comprises:
   a pulse seed source configured to generate a pulse light beam;
   a light splitting coupler, arranged along an optical path of the pulse light beam and configured to split the pulse light beam into a plurality of sub-beams to generate a plurality of pulse light beams; and
   a second beam combiner, the plurality of sub-beams being projected on the second beam combiner to combine into one light beam and the combined light beam being projected to the light field control module.

10. The device as claimed in claim 9, further comprising:
    a plurality of pulse amplification modules, arranged along optical paths of the plurality of sub-beams one by one, configured to amplify pulses of the plurality of sub-beams and arranged between the light splitting coupler and the second beam combiner.

11. The device as claimed in claim 9, further comprising:
    a plurality of second delay lines, arranged along optical paths of the plurality of sub-beams one by one, between the plurality of pulse amplification modules and the second beam combiner, and configured to adjust pulse time positions of the plurality of sub-beams so that a plurality of pulse time in the beam coincide after the plurality of sub-beams pass through the second beam combiner.

12. The device as claimed in claim 11, further comprising:
    a plurality of pulse compression devices, arranged along the optical paths of the plurality of sub-beams one by one, between the plurality of pulse amplification modules and the plurality of second delay lines, and configured to compress pulse widths of the plurality of sub-beams to increase pulse light peak powers of the plurality of sub-beams.

13. The device as claimed in claim 12, further comprising:
    a plurality of beam collimating devices, arranged along the optical paths of the plurality of sub-beams one by one, between the plurality of pulse compression devices and the plurality of second delay lines, and configured to adjust the plurality of sub-beams into a plurality of collimated beams that satisfy an ionization threshold after being converged.

14. The device as claimed in claim 9, wherein there are a plurality of second beam combiners, a number of the plurality of second beam combiners is one less than a number of the plurality of sub-beams, the plurality of second beam combiners are arranged at intervals along one of the plurality of sub-beams, remaining sub-beams are projected on the plurality of second beam combiners one by one, and the plurality of sub-beams are combined into one light beam.

15. The device as claimed in claim 9, further comprising:
a plurality of second reflecting mirrors, wherein a number of the plurality of second reflecting mirrors is the same as a number of the plurality of second beam combiners, and the plurality of second reflecting mirrors are arranged between the plurality of second delay lines and the plurality of second beam combiners one by one and configured to reflect the plurality of sub-beams to the plurality of second beam combiners.

16. The device as claimed in claim 1, wherein the pulse-light-source module comprises:
a plurality of pulse light sources configured to generate the plurality of pulse light beams, respectively;
wherein a pulse energy of each of the plurality of pulse light sources is less than an air ionization threshold and a sum of the pulse energy of each of the plurality of pulse light sources is greater than the air ionization threshold.

17. The device as claimed in claim 16, further comprising:
a second pulse-repetition-frequency adjustment component, arranged between the plurality of pulse light sources and the display area and configured to adjust pulse repetition frequencies of the plurality of pulse light sources.

18. The device as claimed in claim 17, wherein the second pulse-repetition-frequency adjustment component comprises:
a plurality of second photodetectors, arranged one by one between the plurality of pulse light sources and the display area and configured to detect the pulse repetition frequencies of the plurality of pulse light sources;
a second frequency reference source configured to provide a frequency reference standard; and
a second servo controller, signally coupled to the plurality of second photodetectors, the second frequency reference source and the plurality of pulse light sources and configured to control the pulse repetition frequencies of the plurality of pulse light sources based on feedback information of the plurality of second photodetectors and feedback information of the second frequency reference source.

* * * * *